United States Patent
Karuppasamy

(10) Patent No.: US 10,515,315 B2
(45) Date of Patent: Dec. 24, 2019

(54) SYSTEM AND METHOD FOR PREDICTING AND MANAGING THE RISKS IN A SUPPLY CHAIN NETWORK

(71) Applicant: Wipro Limited, Bangalore (IN)

(72) Inventor: Selvakuberan Karuppasamy, Chennai (IN)

(73) Assignee: Wipro Limited, Bangalore (IN)

( * ) Notice: Subject to any disclaimer, the term of this patent is extended or adjusted under 35 U.S.C. 154(b) by 729 days.

(21) Appl. No.: 15/086,369

(22) Filed: Mar. 31, 2016

(65) Prior Publication Data

US 2017/0262764 A1 Sep. 14, 2017

(30) Foreign Application Priority Data

Mar. 11, 2016 (IN) .............................. 201641008563

(51) Int. Cl.
*G06N 20/00* (2019.01)
*G06N 5/02* (2006.01)
(Continued)

(52) U.S. Cl.
CPC .............. *G06N 20/00* (2019.01); *G06N 5/025* (2013.01); *G06Q 10/0631* (2013.01); *G06Q 10/08* (2013.01)

(58) Field of Classification Search
CPC ...... G06N 99/005; G06N 5/025; G06N 7/005; G06N 20/00; G06Q 10/0631; G06Q 10/08
See application file for complete search history.

(56) References Cited

U.S. PATENT DOCUMENTS

2008/0071776 A1* 3/2008 Cho ................... G06F 17/30867
2009/0248488 A1 10/2009 Shah et al.
(Continued)

OTHER PUBLICATIONS

Imielinski et al., "Adatabase perspective on knowledge discovery", Nov. 11, 1996, Communications of the ACM, vol. 39, Issue 11, pp. 58-64 (Year: 1996).*
(Continued)

*Primary Examiner* — Kamran Afshar
*Assistant Examiner* — Brent Johnston Hoover
(74) *Attorney, Agent, or Firm* — Finnegan, Henderson, Farabow, Garrett & Dunner, LLP

(57) ABSTRACT

This disclosure relates to predicting and managing supply chain network risks. In one embodiment, a processor-implemented method obtains identifiers for supply chain contributors and parameters; and a query. The method performs a natural language processing algorithm on the query to extract text components, which it analyzes to identify supply chain component clusters and risk identifiers. It also includes executing a machine learning technique for learning of the risk identifiers and generating co-occurrence rules between the risk identifiers, as well as associated rule support and rule confidence parameters. It further includes sorting the co-occurrence rules to generate a prioritized rules list, and generating a risk prediction model for the supply chain using the prioritized rules list, using a classifier algorithm. The method further includes training the risk prediction model using a machine learning techniques for incremental learning, and generating a supply chain element modification using the trained risk prediction model.

15 Claims, 9 Drawing Sheets

(51) Int. Cl.
*G06Q 10/06* (2012.01)
*G06Q 10/08* (2012.01)

(56) References Cited

U.S. PATENT DOCUMENTS

| | | | |
|---|---|---|---|
| 2012/0310874 A1* | 12/2012 | Dantressangle | G06F 17/30315 |
| | | | 707/600 |
| 2013/0085801 A1 | 4/2013 | Sharpe et al. | |
| 2013/0179215 A1 | 7/2013 | Foster et al. | |
| 2014/0018951 A1* | 1/2014 | Linton | G06N 5/02 |
| | | | 700/105 |
| 2014/0245376 A1* | 8/2014 | Hibbert | H04L 63/1433 |
| | | | 726/1 |
| 2015/0112664 A1* | 4/2015 | Srinivasan | G06F 17/2785 |
| | | | 704/9 |
| 2015/0120373 A1 | 4/2015 | Bajaj et al. | |
| 2015/0142509 A1 | 6/2015 | Treacey et al. | |
| 2015/0339263 A1 | 11/2015 | Abu El Ata et al. | |
| 2016/0371618 A1* | 12/2016 | Leidner | G06N 5/025 |

OTHER PUBLICATIONS

Agrawal et al. "Fast Algorithms for Mining Association Rules", 1994, Proc. 20th Int. Conf. Very LargeData Bases, pp. 487-499 (Year : 1994).*

* cited by examiner

200

| Sl. No | Level of Risk | % Impact |
|---|---|---|
| 1 | Very_low | 0-10 |
| 2 | Low | 11-30 |
| 3 | Medium | 31-70 |
| 4 | High | 71-90 |
| 5 | Very_high | 91-100 |

| Sl. No | Cluster Name | Components |
|---|---|---|
| 1 | Management Related | Supplier, Demand, Transportation |
| 2 | Internal to supply chain | Process, Storage, Information |
| 3 | External to supply chain | Finance, Environment |

| x1 = Process Quality | X2 = Capacity Flexibility | Y1 = Demand Variability | Risks (Decision Variable |
|---|---|---|---|
| Low | Low | High | high |
| Medium | Low | High | high |
| High | Medium | High | high |

| 805 % of Risks Allowed (Overall Supply Chain) | 810 Demand Variability | 815 Capacity Flexibility | 820 Supplier Outage | 825 Competitors | 830 Overhead Costs | 835 Bullwhip effects | 840 Process Quality | 845 Eqmt Reliability | 850 Unavailable Of Components |
|---|---|---|---|---|---|---|---|---|---|
| 10 | very_low | High | very_low | very_low | very_low | very_low | very_high | High | very_low |
| 20 | Low | High | very_low | Low | very_low | very_low | very_high | High | very_low |
| 30 | Low | High | very_low | Low | very_low | low | High | High | very_low |
| 40 | Low | Medium | Low | Medium | Low | medium | High | medium | low |
| 50 | medium | Medium | Low | Medium | Low | medium | medium | medium | low |
| 60 | high | Low | Low | Medium | High | medium | medium | medium | medium |
| 70 | high | Low | High | Medium | High | very_high | Low | Low | high |
| 80 | very_high | Low | High | High | very_high | very_high | Low | Low | high |
| 90 | very_high | Low | very_high | very_high | very_high | very_high | Low | very_low | very_high |
| 100 | very_high | Low | very_high | very_high | very_high | very_high | very_low | very_low | very_high |

FIG. 8

SYSTEM AND METHOD FOR PREDICTING AND MANAGING THE RISKS IN A SUPPLY CHAIN NETWORK

PRIORITY CLAIM

This U.S. patent application claims priority under 35 U.S.C. § 119 to: India Application No. 201641008563, filed Mar. 11, 2016. The entire contents of the aforementioned application are incorporated herein by reference.

TECHNICAL FIELD

This disclosure relates generally to machine learning, and more particularly to system and method for predicting and managing the risks in a supply chain network.

BACKGROUND

A supply chain is a network of actions followed or practiced to achieve a common goal. One objective of the supply chain may typically be customer satisfaction. If the supply chain is organized properly or working properly without any disruption, then the supply chain may be considered value added. The net profitability from the supply chain may be higher than otherwise. On the other hand, if the supply chain is not behaving properly or meeting the objective, then the entire supply chain may result in losses.

Losses in the supply chain in a market may be due to the risk or disruption of the supply chain. Hence, organizations adopt their own methodologies for managing supply chain risks. Supply chain risk management may be practiced by several companies, which may strive to have the most optimized supply chain because doing so usually translates to lower costs for the company. Risk prediction models estimate the risk of developing future outcomes for individuals based on one or more underlying characteristics (predictors).

The inventors here have recognized several technical problems with such conventional systems, as explained below. As a proactive measure, companies would like to, but currently do not, have the ability to predict supply chain risks before they can cause actual damage to the entire supply chain. The prediction of risks may be tricky, however. Prediction models have to be build based on the history of the risks and how the system behaves, to properly mitigate these risks.

In order to build prediction models, the researchers may use simulation, data mining techniques, statistics, and machine learning techniques. While these risk prediction models may help in pointing out the occurrence of the risk as a probability estimate, currently, such prediction models are incapable of analyzing risks and taking appropriate action before the occurrence of the risk.

Previously, Failure Mode Effect Analysis (FMEA) has been used to analyze the risks and mitigate the supply chain risks. FMEA may be used to predict the risk priority number (RPN) in order to prioritize the high priority risks. The current risk prediction solutions available, however, are not able to:

1. Predict the future risks as a preventive measure
2. Understand the complexity of risks in the supply chain
3. Identify relationship of the various risks within the supply chain
4. Predict the future risks without any disruption to the supply chain

SUMMARY

Embodiments of the present disclosure present technological improvements as solutions to one or more of the above-mentioned technical problems recognized by the inventors in conventional systems. For example, in one embodiment, a machine learning prediction system is disclosed, comprising a hardware processor, and a memory storing instructions executable by the hardware processor to perform a method. The method may include obtaining, via the hardware processor, for a supply chain, identifiers for one or more supply chain contributors, one or more supply chain parameters including a supply chain type and an identification of a supply chain process flow; and one or more user parameters including a user query. The method may also include performing, via the hardware processor, a natural language processing algorithm on the user query to extract one or more text components including: one or more keywords, one or more names, one or more nouns, and one or more named entities. The method may comprise analyzing, via the hardware processor, the extracted text components to identify one or more supply chain component clusters, and identifying, via the hardware processor, one or more risk identifiers by comparing the extracted text components to risk identifiers included in the one or more supply chain component clusters. Further, the method may include executing a machine learning technique for learning of the one or more identified risk identifiers, and generating, via the hardware processor, one or more co-occurrence rules between the identified risk identifiers, as well as associated rule support and rule confidence parameters. Also, the method may include sorting, via the hardware processor, the one or more co-occurrence rules to generate a prioritized rules list, and generating, via the hardware processor, a risk prediction model for the supply chain using the prioritized rules list, using a classifier algorithm. Further, the method may include training, via the hardware processor, the risk prediction model using a machine learning techniques for incremental learning, and generating, via the hardware processor, a supply chain element modification using the trained risk prediction model.

In another embodiment, hardware processor-executable machine learning prediction method is disclosed. The method may include obtaining, via the hardware processor, for a supply chain, identifiers for one or more supply chain contributors, one or more supply chain parameters including a supply chain type and an identification of a supply chain process flow; and one or more user parameters including a user query. The method may also include performing, via the hardware processor, a natural language processing algorithm on the user query to extract one or more text components including: one or more keywords, one or more names, one or more nouns, and one or more named entities. The method may comprise analyzing, via the hardware processor, the extracted text components to identify one or more supply chain component clusters, and identifying, via the hardware processor, one or more risk identifiers by comparing the extracted text components to risk identifiers included in the one or more supply chain component clusters. Further, the method may include executing a machine learning technique for learning of the one or more identified risk identifiers, and generating, via the hardware processor, one or more co-occurrence rules between the identified risk identifiers, as well as associated rule support and rule confidence parameters. Also, the method may include sorting, via the hardware processor, the one or more co-occurrence rules to generate a prioritized rules list, and generating, via the hardware processor, a risk prediction model for the supply chain using the prioritized rules list, using a classifier algorithm. Further, the method may include training, via the hardware processor, the risk prediction model using a machine learning techniques for incremental learning, and generating, via the hardware processor, a supply chain element modification using the trained risk prediction model.

In yet another embodiment, a non-transitory computer-readable medium is disclosed, storing instructions executable by a hardware processor to perform a method. The method may include obtaining, via the hardware processor, for a supply chain, identifiers for one or more supply chain contributors, one or more supply chain parameters including a supply chain type and an identification of a supply chain process flow; and one or more user parameters including a user query. The method may also include performing, via the hardware processor, a natural language processing algorithm on the user query to extract one or more text components including: one or more keywords, one or more names, one or more nouns, and one or more named entities. The method may comprise analyzing, via the hardware processor, the extracted text components to identify one or more supply chain component clusters, and identifying, via the hardware processor, one or more risk identifiers by comparing the extracted text components to risk identifiers included in the one or more supply chain component clusters. Further, the method may include executing a machine learning technique for learning of the one or more identified risk identifiers, and generating, via the hardware processor, one or more co-occurrence rules between the identified risk identifiers, as well as associated rule support and rule confidence parameters. Also, the method may include sorting, via the hardware processor, the one or more co-occurrence rules to generate a prioritized rules list, and generating, via the hardware processor, a risk prediction model for the supply chain using the prioritized rules list, using a classifier algorithm. Further, the method may include training, via the hardware processor, the risk prediction model using a machine learning techniques for incremental learning, and generating, via the hardware processor, a supply chain element modification using the trained risk prediction model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2 is an exemplary table of risk levels according to some embodiments.

FIG. 3 is an exemplary cluster identification table in accordance with some embodiments.

FIG. 7 is an exemplary risk identification table in accordance with some embodiments.

FIG. 8 is an exemplary risk prediction table in accordance with some embodiments.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
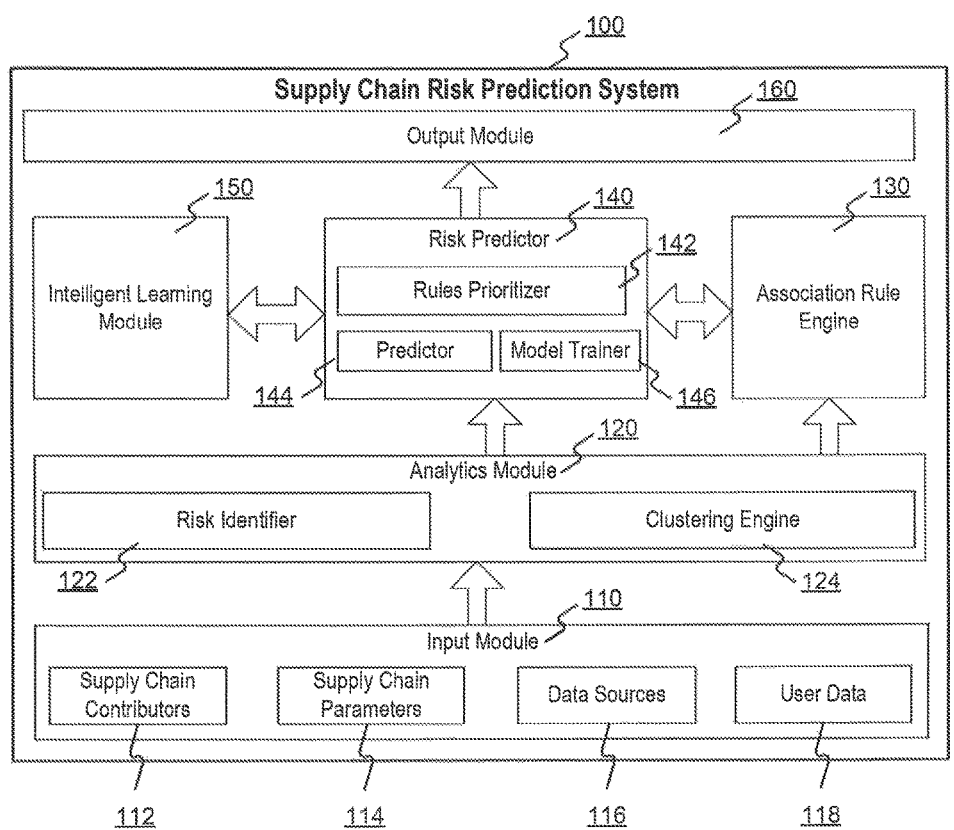
FIG. 1 illustrates an exemplary block diagram of a supply chain risk prediction system according to some embodiments.

FIG. 1 illustrates an exemplary block diagram of a supply chain risk prediction system 100 according to some embodiments. In some embodiments, a supply chain risk prediction system 100 may include an input module 110, an analytics module 120, an association rule engine 130, a risk predictor 140, an intelligent learning module 150, and an output module 160.

Input module 110 may obtain and provide inputs into the remainder of system 100. Such inputs may include supply chain contributors 112, supply chain parameters 114, data sources 116, and user data 118.

Supply Chain Contributors 112—A supply chain may include a system of organizations, people, activities, information, and resources which transform natural resources, raw materials, and components into a finished product that is delivered to an end customer involved in moving a product or service from supplier to customer. It may also be defined as a network created amongst different companies producing, handling and/or distributing a specific product. Further, the supply chain may encompass the steps it takes to get a good or service from the supplier to the customer. The contributors of the supply chain may include raw material suppliers, manufacturers, whole-salers, retailers, distributors and the customers. The customers may vary depending upon the types of supply chain.

Supply Chain Parameters 114—Most of the organizations or enterprises constitute the following supply chain parameters. It typically may include:
1. Supply
2. Demand
3. Transportation
4. Process
5. Storage
6. Information
7. Finance
8. Environment Also the level of the risks may be decided based on the impact of the risks. FIG. 2 is an exemplary table 200 of risk levels according to some embodiments. Table 200 may include information on levels of risk 220 and associated risk impact 230. For example, table 200 may include a number of risk levels (see 210), and a percentage risk impact score or range corresponding to each risk level. The level of the risks may be defined in the configuration stage.

Returning to FIG. 1, input module 110 may access data sources 116.

Data Sources 116—The data sources required for the risk identification may vary depending upon the supply chain parameters of the particular organization. Based on the parameters of the supply chain, the major risks due to the supply chain parameters may also vary. The data sources may also include clusters and components.

FIG. 3 is an exemplary cluster identification table 300 in accordance with some embodiments. Here as an example is illustrated a product manufacturing supply chain. In this supply chain, the components are grouped into three clusters 320 as shown in table 300 (see 310). The clusters 320 and the hierarchy of the supply chain may be set in the configuration of the system 100, since the hierarchy of the supply chain, the supply chain components 330, and the clusters 320 may vary depending upon the supply chain followed in the particular organization.

Returning to FIG. 1, input module 110 may access user data 118.

User Data 118—The user data may denote user queries provided to the system 100. The query may identify an exact problem description posed by a user.

System 100 may include an analytics module 120, which may include a risk identifier 122 and a clustering engine 124.

Risk Identifier 122—The risk identifier 122 may include in-built natural language processor (NLP) and/or text analyzer components. Based on the user data 118, the risk identifier 122 may identify the exact risks from the user query. The output from the analytics module 120 may include keywords, names, nouns and named entities. Based on the clusters (e.g., 320) and the keywords, the exact problem or the risk may be identified.

Clustering Engine 124—The output from the clustering module 124 may include the clusters in which each of the identified risks belongs. The clusters of the risk may be grouped based on the characteristic or the features as defined in the initial configuration of the system 100.

System 100 may include an association rule engine 130. The association rule engine 130 may analyze the association between the risks under various criteria and frame the association rules. An association rule may be an implication expression of the form X→Y, where X and Y are disjoint item sets, i.e. X∩Y=Ø. The strength of an association rule can be measured in terms of its support and confidence. Support may determine how often a rule is applicable to a given data set, while confidence may determine how frequently items in Y appear in transactions that contain X. In a preferred embodiment, the association rules may be framed based on Apriori Itemset Generation algorithm for the supply chain data.

Association analysis results may require interpretation. The inference made by an association rule may sometimes, but not always, imply causality. Instead, it may suggest a (strong) co-occurrence relationship between items in the antecedent and consequent of the rule. Causality, on the other hand, may require knowledge about the cause-and-effect attributes in the data, and typically may involve relationship being identified and learned over time (e.g., ozone depletion leads to global warming). The association rules may be generated considering all the levels of factors of risks (e.g., very_low, low, medium, high, very_high) for all attributes.

System 100 may include a risk predictor 140. In some embodiments, risk predictor 140 may constitute a core engine for system 100. Based on the association rules generated by association rule engine 130, risk predictor 140 may prioritize, predict the risks based on a learning prediction model, train, and validate results. Risk predictor 140 may include a rules prioritizer 142.

Rules Prioritizer 142—Rules Prioritizer 142 may play a vital role in reducing the memory savings while identifying the risks in the complex supply chain. The prioritization may be based on the consequence of the risks identified. For example, the priority may be given to very high and high risks than considering the medium risks. The least priority may be given to low and very low risks.

Risk predictor 140 may include a predictor 144.

Predictor 144—The predictor 144 may help in building the prediction model using the classifiers with the input of the association rules. It may understand the risk levels and the identified risk, and help the model that will be used for predicting future risks in the supply chain.

Risk predictor 140 may include a model trainer 146.

Model Trainer 146—The model trainer 146 may help in continuous validation of the predictive model build with the continuous communication with the intelligent learning module 150 and the association rule engine 130.

System 100 may include an intelligent learning module 150. The intelligent learning module 150 may be running behind the entire system 100. It may use machine learning techniques for incremental learning. The output of the association rule engine 130, risk predictor 140, and intelligent learning module 150 may be provided via an output module 160 to other components outside the supply chain risk prediction system 100.

Figure 4:
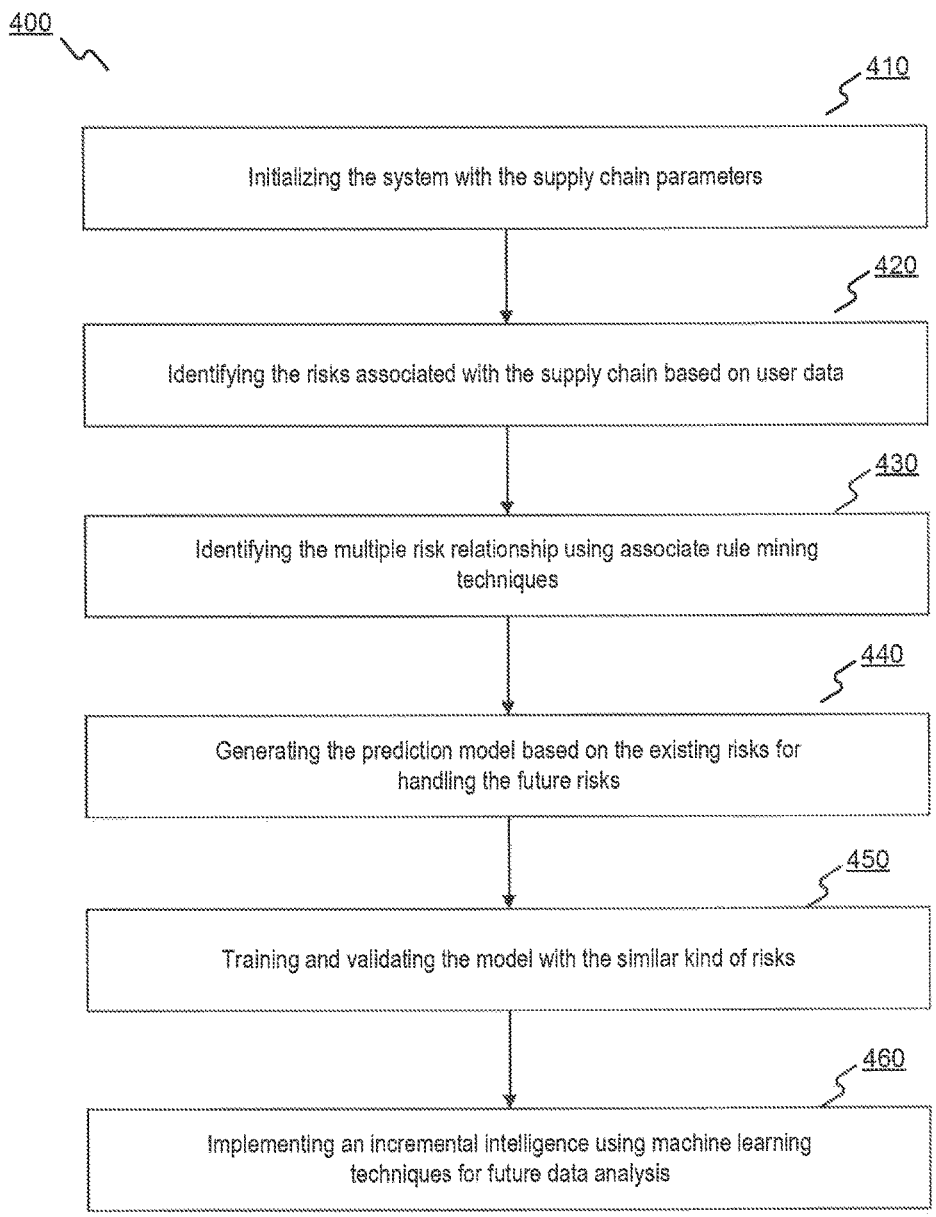
FIG. 4 is a flow diagram illustrating an exemplary machine learning prediction method in accordance with some embodiments.

FIG. 4 is a flow diagram illustrating an exemplary machine learning prediction method 400 in accordance with some embodiments.

At step 410, the system 100 may be initialized with the supply chain parameters 114. Further, the method 400 may include initializing the system with the supply chain contributors 112 and the supply chain parameters 114 within the supply chain. Not all the supply chains may have the same contributors 112 and parameters 114. Depending upon the supply chain followed within a particular enterprise, both the parameters 114 and contributors 112 may vary. Experts with the organization may identify the type of the supply chain, and based on that a supply chain process flow may be also identified. All these tasks may be performed in the initialization of the system 100. Also the user query (as part of user data 118) may be the input to the system 100. The user queries may be in the form of call logs or service requests as well.

At step 420, the method 400 may continue with identifying the risks associated with the supply chain based on user data 118. Based on the user data 118, the risk identifier 122 may identify the risk in combination with the clustering engine 124. The risk identifier may have built-in (NLP) and text analyzer components. These components may analyze the user data 118 by removing the junk, spam, removing stop words, and identifying co-reference relationships between the sentences. The entire output from these subsystems may be the keywords, named entities and the clusters to which the keywords belong to.

The NLP component may take the user query as input. The NLP component may capture user utterances (e.g., via microphone, text input, etc.) and processes them. The processing of the text may include identification of the individual sentences, tokenization of the sentences in the text, identification of the named entities like names of places, organizations, currencies, times, dates, etc. Also, NLP may be used to identify the noun and verb phrases in the sentence. The NLP may point out the relationships between the sentences in the text and identify the nouns and pronouns that describe the problem.

The text analyzer may remove unwanted junk words from the user query. The text analyzer may help in the identification of keywords from the user text. Both the NLP module and the text analyzer may combine to form the necessary named entities and keywords that help in the identification of the clusters for the particular risk.

The output from the risk identifier 122 may be provided to the clustering engine 124 to identify the groups the user utterance is mapped to. By passing the user utterance to NLP and the text analyzer, the output may be the keywords from the user utterances. The output of the text analyzer/NLP may be passed into the clustering engine 124. Clustering engine 124 may analyze the keywords, and map the keywords to the clusters based on the attributes of the clusters. For example, in the system embodiment described by FIG. 3, there are 3 clusters as mentioned in the configuration namely:
1. Internal to Supply Chain
2. External to Supply Chain and
3. Management Related.

The corresponding attributes of the supply chain may be mapped to the clusters.

Take an example of product manufacturing supply chain for illustration. Here there may be 7 supply chain parameters and 28 risks associated with it. The entire 7 supply chain parameters may be grouped under 3 clusters. These all may be defined in the configuration stage for the system 100. The entire hierarchy of the parameters and the corresponding risks in the supply chain are as shown in FIG. 5.

Figure 5:
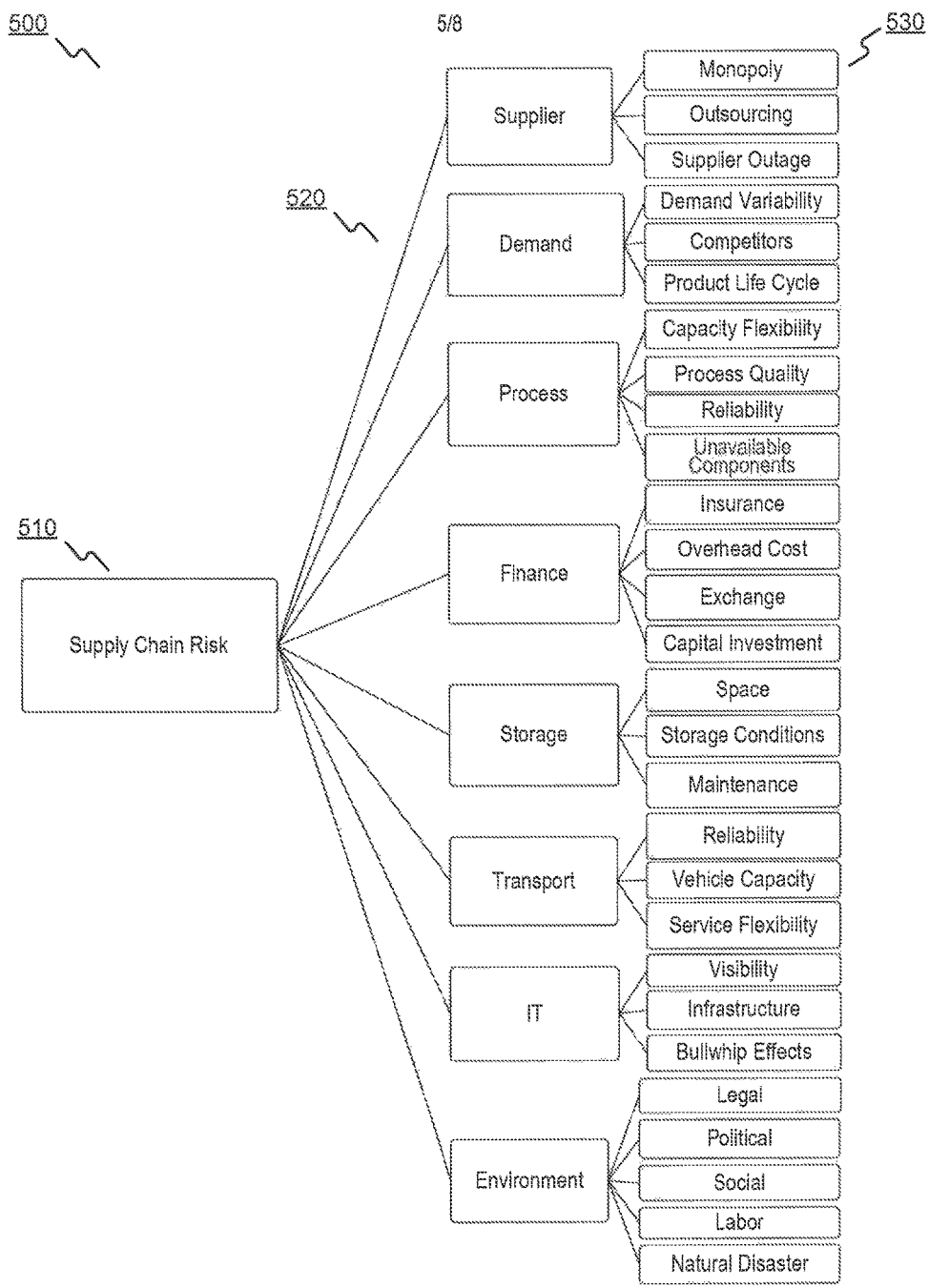
FIG. 5 illustrates an exemplary block diagram of a supply chain parameter and risk hierarchy according to some embodiments.

FIG. 5 illustrates an exemplary block diagram 500 of a supply chain parameter and risk hierarchy according to some embodiments. At a first level of the hierarchy 510 may lie an identification of supply chain risks. At a second level 520 of the hierarchy may lie supply chain parameters 520, such as those described above as elements 330 of FIG. 3. At a third level of the hierarchy 530 may lie a set of risks associated with each of the supply chain parameters.

Returning to FIG. 4, assume, for example, that the user data/query received by system 100 is: "The price of the mobile phone changes day by day." The risk identifier 122 (using built-in NLP and/or text analyzer components) may identify the risks based on the clusters and the keywords from the user data 118.

In our example, the NLP component may identify the following:
1. Nouns: mobile, phone
2. Coref: price-→mobile phone
3. Adjective: day by day The text analyzer component may identify the keywords by the removal of stop words and junk. The keywords identified in our example may be:
1. price
2. mobile phone
3. change
4. day by day These keywords and co-reference relations may be passed into the clustering engine 124 to check the attributes of the clusters matching with the keywords. The clustering engine 124 may check for the clusters as shown in FIG. 3. For example, system 100 may make the determination that the identified keywords fit only into the "management related" cluster (see 320), but not the "internal to supply chain" or "external to supply chain" clusters. Thus, the system may identify the components under the management related cluster, and thus identify supplier, demand, and transportation components (see 330).

Upon identifying the cluster and its components, the system 100 may pass this information back to risk identifier 122, which may compare the relationship of the user data 118 with the components of the clusters. Continuing the example above, with reference to FIG. 5, the following relationships may be identified (see 530):
1. Supplier—Monopoly, Outsourcing, Supplier Outage
2. Demand—Demand variability, competitors, Product Life cycle
3. Transportation—Reliability, Vehicle capacity, Service Flexibility In this example taken, the NLP subsystem may identify the co-reference relationship between the keywords: prices, mobile phone, and day by day. Hence, for example, based on the relationships identified, the system 100 may classify "Demand variability" under the component Demand.

Hence the risk identified may be "Demand variability" as per the Product Manufacturing Supply Chain. The risks identified may be learned by the intelligent learning module 150 and may be stored in a structured database, to later help in learning similar kind of risks and predict risks accordingly.

Returning to FIG. 4, at step 430, the method may continue by identifying multiple risk relationships using association rule mining techniques. In a supply chain there are some supply chain parameters. Under each supply chain parameters there may be some well-defined risks associated with it. Whenever a new risk appears, it may need to be fit into the supply chain parameters, and may fix the appropriate issue associated with the supply chain parameters. But it may also introduce a new risk in the supply chain after the closure of this risk.

Based on the output from the analytics module 120, the association rule engine 130 may be triggered to generate the association rules with respect to the risks given by the analytics module 120. In some embodiments, association rules may be generated based on the following criteria.
1. Association relationships may be considered among the risks under the components and across the components as well. For example, if Supplier is one component, and Transportation is another component, the association rules may be formed in such a way that they may include the relationship between the Supplier components and also with Transportation components.
2. A decision variable may be defined called "risks" within the association rule. The values of the variable "risks" may be any of the following {high, medium, low}, as an example.
3. Depending upon the value of the "risks" variable, the rules may be prioritized.
4. Each of the risks in the supply chain also may have, for example, 5 levels of risk e.g., {very_high, high, medium, low, very_low}.
5. The association rule may have a single risk with its decision variable, or it may have two or more risks associated with the corresponding risk levels.
6. Some redundant association rules may be formed.

The association rules may provide several advantages in various embodiments:
1. Identifying the major risks based on the decision variable.
2. Determining how the risks are interrelated within the supply chain; and 3. Determining whether a solution for any risk will cause any disruption in the supply chain.

For example, consider a particular supermarket where inventory is an issue, i.e. there is no space for accommodating huge inventories. Hence the risk may be identified as "Space issue" (assuming this risk identification was included as a category during system initialization). In order to fix the Space Issue, a solution may be planned such that goods arrive on a just-in-time (JIT) arrival basis. Now in this case, the Space Issue may get resolved. Since JIT was newly introduced, a spike in the amount of Transportation costs may be expected. Hence the risk of increasing Transportation Costs may need to be next managed effectively by system 100 without any disruption in the supply chain. Hence, the association rules may be generated within the major risks under the parameters of the supply chain.

There may be large number of association rules generated for the risks identified by the risk identifier 122 and the clustering engine 124. Accordingly, some embodiments may prioritize the risks based on the impact of the risks within the supply chain. Sometimes, prioritization may be used in reducing the memory savings while identifying the risks in the complex supply chain. The prioritization may be based on the consequence of the risks identified. The rules prioritizer 142 may take care of the prioritization of the association rules based on the impact of the risks. The rules prioritizer 142 may look at the levels of the decision variable. The priority may be given to the high risks, then to the medium risks, and finally to the low risks.

Once the risk is identified, the possible relationships existing between the identified risk and the other risks may need to be identified. In our example, the risk identified is "Demand variability". Hence the association rules related with "Demand variability" generated by the association rule engine 130 are given in FIG. 6.

Figure 6:
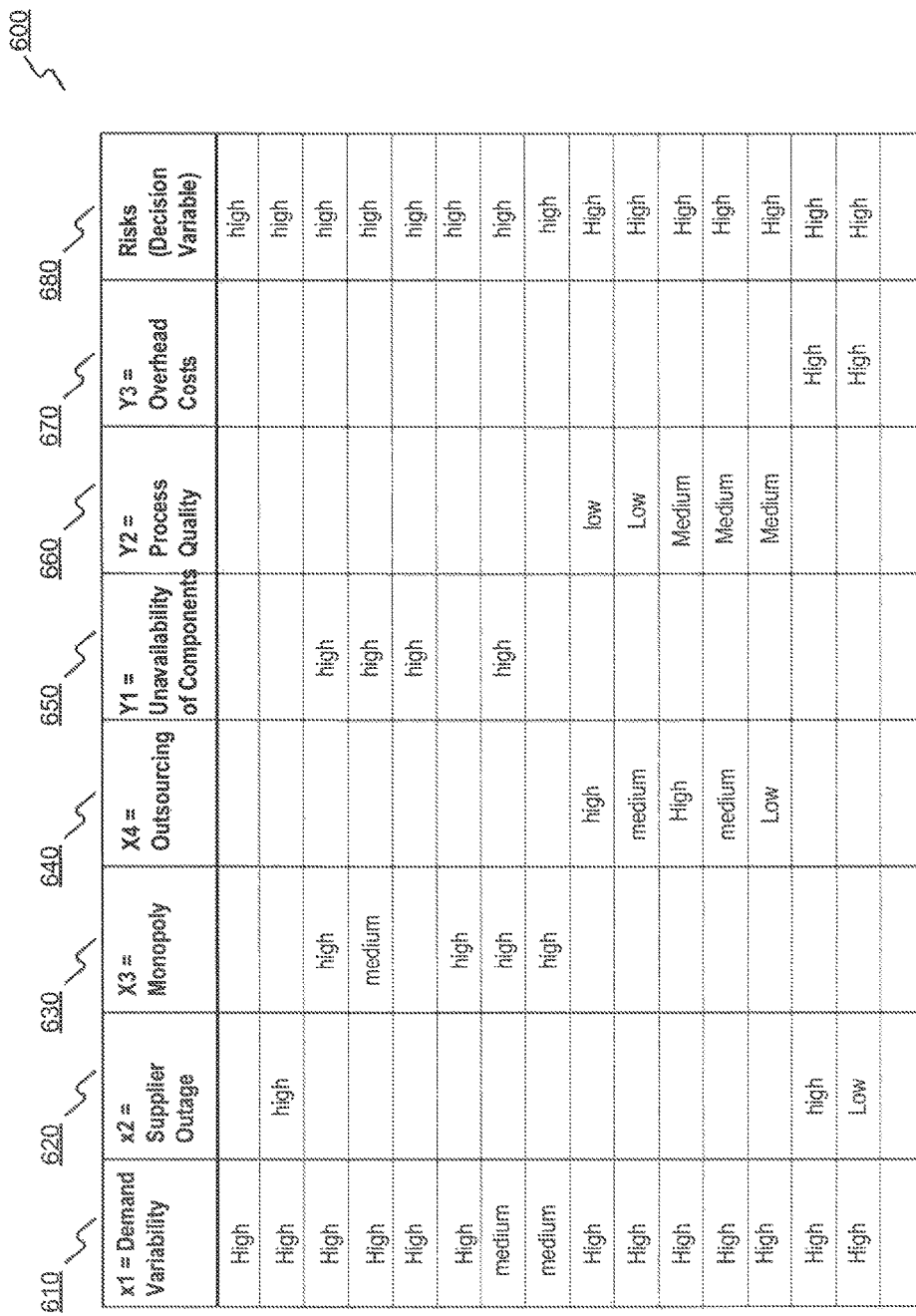
FIG. 6 is an exemplary association rules table in accordance with some embodiments.

FIG. 6 is an exemplary association rules table 600 in accordance with some embodiments. An association rules table may identify the risk impact posed by a combination of risk factors. In some embodiments, the association rules related to the risk (high impact) alone may be considered. The association rule may be represented as X→Y where X {x1, x2, x3 . . . } and Y {y1, y2, y3 . . . }. The decision variable "risks" is placed at the last column. The levels of each and every component are placed at the corresponding rows. That is, for a given combination of risk factors given in 610, 620, 630, 640, 650, 660, 670, and 680, the risk impact may be provided in column 680. The table 600 of FIG. 6 may help identify risk impacts based on risk factors that are a consequence of another identified risk. Similarly, FIG. 7 is another exemplary risk identification table 700 in accordance with some embodiments. An association rules table 700 may identify the risk impact 740, 710, 720, and 730 posed by a combination of risk factors. The table 700 of FIG. 7 may help identify risk impacts based on risk factors that are a cause of another identified risk.

Returning to FIG. 4, at step 440, the method may continue by generating a prediction model, based on the existing risks, for handling future risks. From step 430, the high impact risks may be identified. The association rules related to each and every risks may be stored in a database for future analysis. In our example, a risk considered was "Demand variability". Based on the existing risks and the association rules, a predictive model may be built by the risk predictor 140 according to the following exemplary procedure:

1. Classification algorithms like Naïve Bayes, SVM classifiers may be used to classify the various risks (associated with the identified risk) involved in the association rules. For example, in the case of "Demand variability", the various other risks that are involved may be Monopoly, supplier outage, overhead costs, etc. (see FIG. 6).
2. The system 100 may check whether the identified risk factor is a consequence or cause of the identified risk, and identify those causes or consequences using an association rules table.
3. Use any probabilistic classifier (e.g., Naïve Bayes) the system 100 may classify the level of the risks.
4. The risk prediction model may built in such a way as to identify how the identified risk causes the impacts, and what are the other causes/risks related with the identified risk that may cause disruption in the supply chain.
5. The system 100 may map the results and the risk levels with the % of risk allowed in the supply chain.

FIG. 8 is an exemplary risk level prediction table 800 in accordance with some embodiments. The table 800 provides levels of various risks mapped with the % of risks allowed in the Product Manufacturing supply chain. For example, column 805 provides various tiers of overall % of risks allowed in the system. The composition of risk impact from various factors may then be obtained by reading through columns 810, 815, 820, 825, 830, 835, 840, 845, and 850. For example, at low overall supply chain risks, the demand variability is "very_low," but as the overall supply chain risk increases, the demand variability becomes higher. Similarly, at low overall supply chain risks, the equipment reliability poses a relatively high component of that risk, but as overall supply chain risk becomes higher, the equipment reliability becomes less of a contributor to the overall risk.

Returning to FIG. 4, at step 450, the method continues with training and validating the model with the similar kind of risks. The model trainer 146 may perform the training and validation of the prediction model built by the risk predictor 140. The model trainer 146 may perform such function by the following procedure:

1. If a new risk comes, model trainer 146 may identify the nature of the risks using the model generated from the risk predictor 140;
2. The association rule engine 130 may keep on generating the rules based on the risks identified, while model trainer 146 may keep on validating the model with the new set of rules generated for each and every risk identified.

Based on the predictor model generated, model trainer 146 may alert the supply chain contributors if something goes (or is likely to shortly) go wrong in the supply chain. Also model trainer 146 may analyze the nature of risk and suggest the various risk levels that need to be looked and corrected, in order to proceed with the proper functioning of the supply chain.

At step 460, the method may continue with implementing an incremental intelligence using machine learning techniques for future data analysis. The entire end to end system may monitored by the intelligent learning module 150 and the system 100 may learn the user's behavior and with the existing data 116. From the user query entering the system 100 till the user gets a response output from output module 160, the intelligent learning module 150 may capture data and learn incrementally to aid the actual learning of the system 100. Thus, system 100 may incrementally learn the rules and suggest optimized decision to resolve supply chain risk.

Numerous embodiments of the present disclosure may present various advantages, including:

1. Great Time saving approach
2. Quick Response time
3. Meets the customer satisfaction in supply chain
4. Predict the upcoming risks as a preventive measure.
5. Increases supply chain profitability
6. Incremental learning of the system.

Accordingly, a system and method for predicting and managing the risks in a supply chain network may be implemented using one or more embodiments of the present disclosure, by:

1. Initializing the system with the supply chain parameters
2. Identifying the existing risks associated with the supply chain based on user data
3. Identifying the relation between the risks using association rule mining
4. Generating the prediction model based on the existing risks for handling the future risks
5. Training and validating the model with the similar kind of risks; and
6. Implementing an incremental intelligence using machine learning techniques for future data analytics.

Computer System

Figure 9:
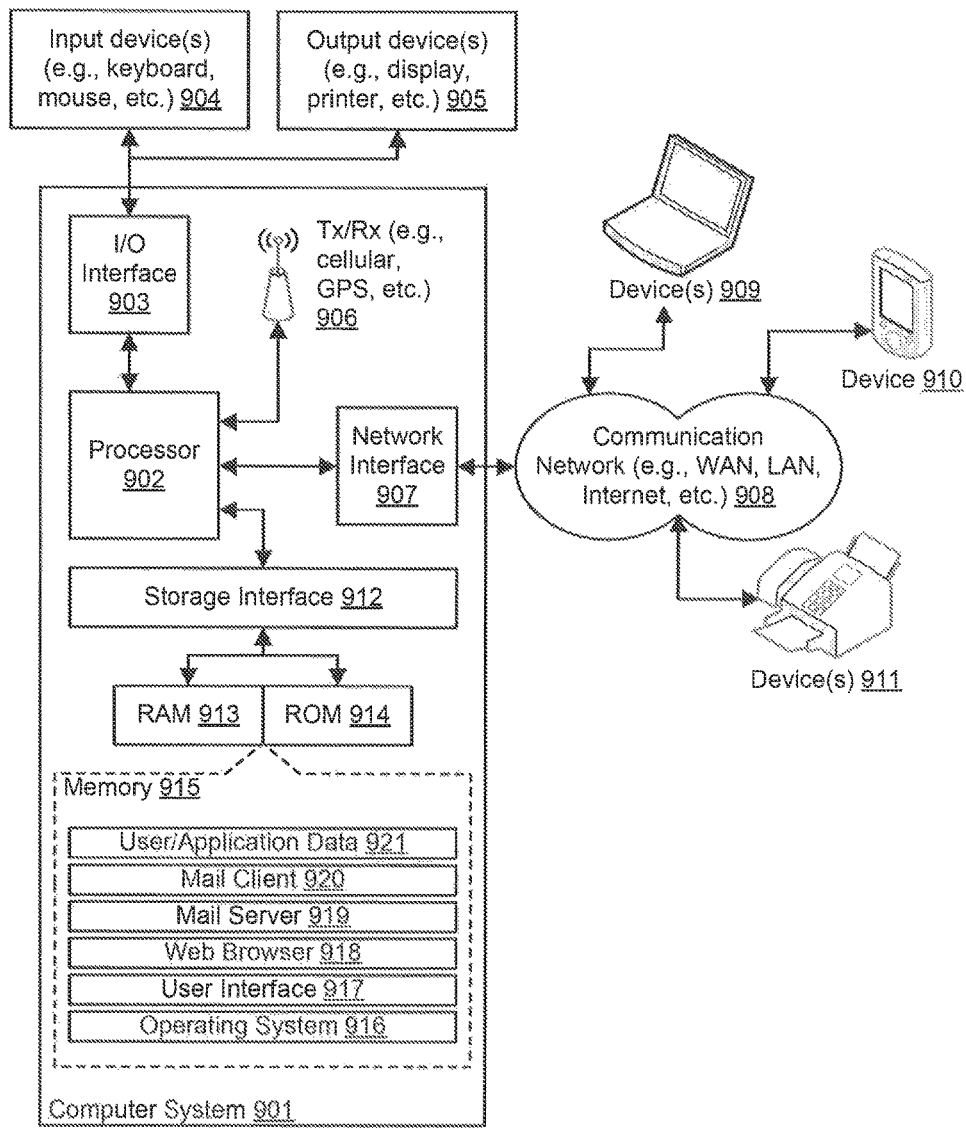
FIG. 9 is a block diagram of an exemplary computer system for implementing embodiments consistent with the present disclosure.

FIG. 9 is a block diagram of an exemplary computer system for implementing embodiments consistent with the present disclosure. Variations of computer system 901 may be used for implementing the devices and systems disclosed herein. Computer system 901 may comprise a central processing unit ("CPU" or "processor") 902. Processor 902 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 910, 911, and 912. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.) via a storage interface 912. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 901 may implement a web browser 918 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 901 may implement a mail server 919 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described system and method for predicting and managing the risks in a supply chain network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A machine learning prediction system, comprising:
a hardware processor; and
a memory storing instructions executable by the hardware processor for:
obtaining, via the hardware processor, for a supply chain, identifiers for one or more supply chain contributors, and one or more user parameters including a user query;
performing, via the hardware processor, a natural language processing algorithm on the user query to extract one or more text components that identify an existing risk within the supply chain, wherein the one or more text components includes: one or more keywords, one or more names, one or more nouns, and one or more named entities;
analyzing, via the hardware processor, the extracted text components to identify one or more supply chain component clusters, wherein each identified supply chain component cluster includes a supply chain parameter that indicates: a supply chain type and an identification of a supply chain process flow to which the existing risk belongs;
generating, via the hardware processor, one or more association rules with respect to the existing risk, wherein the association rules define one or more future risks that are interrelated with the existing risk, and wherein the one or more future risks belongs to same or different supply chain parameter as that of the existing risk;
sorting, via the hardware processor, the one or more association rules to generate a prioritized rules list based on risk impact of the one or more future risks that are a consequence of the existing risk;
generating, via the hardware processor, a risk level prediction model for risk factors associated with the one or more future risks in combination with the existing risks in the supply chain, using the prioritized rules list, using a probabilistic classifier algorithm;

mapping, via the hardware processor, a predicted level of the risk factors with an allowed overall risk level in the supply chain;

providing an alert for the one or more supply chain contributors for correcting at least one of the one or more future risks or the existing risk, based on the risk level prediction model;

training, via the hardware processor, the risk level prediction model using the machine learning technique for incremental learning; and generating, via the hardware processor, a supply chain element modification using the trained risk level prediction model.

2. The system of claim 1, the memory further storing instructions executable by the hardware processor for:

deleting, via the hardware processor, one or more words from the user query using a text analyzing algorithm.

3. The system of claim 2, wherein the text analyzing algorithm is further utilized to identify at least one co-reference relationship between two or more sentences included in the user query.

4. The system of claim 1, wherein the one or more association rules are generated based on an apriori item-set generation algorithm.

5. The system of claim 1, the memory further storing instructions executable by the hardware processor for:

storing, via the hardware processor, one or more risk identifiers associated with the existing risk and the one or more future risks in a structured database.

6. A machine learning prediction method, comprising:

obtaining, via a hardware processor, for a supply chain, identifiers for one or more supply chain contributors, and one or more user parameters including a user query;

performing, via the hardware processor, a natural language processing algorithm on the user query to extract one or more text components that identify an existing risk within the supply chain, wherein the one or more text components includes: one or more keywords, one or more names, one or more nouns, and one or more named entities;

analyzing, via the hardware processor, the extracted text components to identify one or more supply chain component clusters, wherein each identified supply chain component cluster includes a supply chain parameter that indicates: a supply chain type and an identification of a supply chain process flow to which the existing risk belongs;

generating, via the hardware processor, one or more association rules with respect to the existing risk, wherein the association rules define one or more future risks that are interrelated with the existing risk, and wherein the one or more future risks belongs to same or different supply chain parameter as that of the existing risk;

sorting, via the hardware processor, the one or more association rules to generate a prioritized rules list based on risk impact of the one or more future risks that are a consequence of the existing risk;

generating, via the hardware processor, a risk level prediction model for risk factors associated with the one or more future risks in combination with the existing risks in the supply chain using the prioritized rules list, using a probabilistic classifier algorithm;

mapping, via the hardware processor, a predicted level of the risk factors with an allowed overall risk level in the supply chain;

providing an alert for the one or more supply chain contributors for correcting at least one of the one or more future risks or the existing risk, based on the risk level prediction model;

training, via the hardware processor, the risk level prediction model using the machine learning technique for incremental learning; and generating, via the hardware processor, a supply chain element modification using the trained risk level prediction model.

7. The method of claim 6, further comprising:

deleting, via the hardware processor, one or more words from the user query using a text analyzing algorithm.

8. The method of claim 7, wherein the text analyzing algorithm is further utilized to identify at least one co-reference relationship between two or more sentences included in the user query.

9. The method of claim 6, wherein the one or more association rules are generated based on an apriori item-set generation algorithm.

10. The method of claim 6, further comprising:

storing, via the hardware processor, one or more risk identifiers associated with the existing risk and the one or more future risks in a structured database.

11. A non-transitory computer-readable medium storing instructions executable by a hardware processor for:

obtaining, via the hardware processor, for a supply chain, identifiers for one or more supply chain contributors, and one or more user parameters including a user query;

performing, via the hardware processor, a natural language processing algorithm on the user query to extract one or more text components that identify an existing risk within the supply chain, wherein the one or more text components includes: one or more keywords, one or more names, one or more nouns, and one or more named entities;

analyzing, via the hardware processor, the extracted text components to identify one or more supply chain component clusters, wherein each identified supply chain component cluster includes a supply chain parameter that indicates: a supply chain type and an identification of a supply chain process flow to which the existing risk belongs;

generating, via the hardware processor, one or more association rules with respect to the existing risk, wherein the association rules define one or more future risks that are interrelated with the existing risk, and wherein the one or more future risks belongs to same or different supply chain parameter as that of the existing risk;

sorting, via the hardware processor, the one or more association rules to generate a prioritized rules list based on risk impacts of the one or more future risks that are a consequence of the existing risk;

generating, via the hardware processor, a risk level prediction model for risk factors associated with the one or more future risks in combination with the existing risks in the supply chain, using the prioritized rules list, using a probabilistic classifier algorithm;

mapping, via the hardware processor, a predicted level of the risk factors with an allowed overall risk level in the supply chain;

providing an alert for the one or more supply chain contributors for correcting at least one of the one or more future risks or the existing risk, based on the risk level prediction model;

training, via the hardware processor, the risk level prediction model using the machine learning technique for incremental learning; and generating, via the hardware processor, a supply chain element modification using the trained risk level prediction model.

12. The medium of claim 11, further storing instructions executable by the hardware processor for:

deleting, via the hardware processor, one or more words from the user query using a text analyzing algorithm.

13. The medium of claim 12, wherein the text analyzing algorithm is further utilized to identify at least one co-reference relationship between two or more sentences included in the user query.

14. The medium of claim 11, wherein the one or more association rules are generated based on an apriori item-set generation algorithm.

15. The medium of claim 11, further storing instructions executable by the hardware processor for:

storing, via the hardware processor, one or more risk identifiers associated with the existing risk and the one or more future risks in a structured database.

* * * * *